US006223283B1

(12) United States Patent
Chaiken et al.

(10) Patent No.: US 6,223,283 B1
(45) Date of Patent: Apr. 24, 2001

(54) METHOD AND APPARATUS FOR IDENTIFYING DISPLAY MONITOR FUNCTIONALITY AND COMPATIBILITY

(75) Inventors: Craig L. Chaiken, Tomball; William Nott, Spring, both of TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/118,386

(22) Filed: Jul. 17, 1998

(51) Int. Cl.[7] .............................. G06F 9/445
(52) U.S. Cl. .............................. 713/1; 713/100
(58) Field of Search .............................. 713/1, 2, 100, 713/200, 201; 710/8, 15, 19; 348/739; 345/211

(56) References Cited

U.S. PATENT DOCUMENTS 5,548,759 * 8/1996 Lipe .............................. 713/1
5,574,574 * 11/1996 Kawamura .............................. 345/211
5,665,951 * 9/1997 Newman .............................. 235/375
5,793,979 * 8/1998 Lichtman .............................. 709/226
5,806,071 * 9/1998 Balderrama .............................. 707/104
5,832,298 * 12/1998 Sanchez .............................. 710/8
5,910,806 * 6/1999 Narui .............................. 713/2

OTHER PUBLICATIONS

"Extended Display Identification Data (EDID™) Standard," Video Electronic Standards Association, Version 2, Revision 1, 1996, pp. 1–28.

* cited by examiner

*Primary Examiner*—Thomas M. Heckler
(74) *Attorney, Agent, or Firm*—Akin, Gump, Strauss, Hauer & Feld, LLP

(57) ABSTRACT

A monitor includes a file that identifies one or more compatible monitors and/or a list of features of the monitor. A processing unit, such as a computer, that does not specifically support the particular monitor may nonetheless configure itself to operate effectively with the monitor. If the processing unit supports a compatible monitor, it configures itself to operate with the compatible monitor. Otherwise, the processing unit may configure itself to support the features of the particular monitor.

39 Claims, 2 Drawing Sheets

METHOD AND APPARATUS FOR IDENTIFYING DISPLAY MONITOR FUNCTIONALITY AND COMPATIBILITY

BACKGROUND OF THE INVENTION

1. Field of the Invention

The present invention relates generally to monitors and, more particularly, to methods and apparatus for providing monitor/system compatibility.

2. Description of the Related Art

A wide variety of products and devices incorporate monitors to provide visual images to the user. Of these many products, computers and televisions are two of the most common devices that incorporate monitors. In fact, efforts are currently underway to develop "PC TV" products in which the same monitor will be used with a device that acts as both a computer and a television.

At the present time, monitors used with televisions are typically incorporated into a unitary package. Thus, a consumer must find a television that has both the desirable size and type of monitor, along with the desirable functions. In contrast, most of the monitors used with computers are typically available separately, just as are many other peripheral devices that may be coupled to a computer. Thus, consumers generally have the ability to choose among a variety of different monitors to select the monitor having the price, size, resolution, and functionality that the consumer desires, along with the ability to select among a variety of different computers to couple to the monitor.

Although the typical computer consumer is generally afforded a wider variety of options as compared with the typical television consumer, such options are limited. Each time a computer is turned on, it determines what peripheral devices are coupled to it. Since a monitor, like a keyboard or a mouse, is a peripheral device, one of the fundamental operating programs of the computer called the Basic Input Output System, or BIOS, determines whether a monitor is coupled to the computer and whether the monitor that is coupled to the computer is supported by the particular computer. The BIOS must often interact with the monitor to perform functions, such as volume control for instance, and the BIOS code which facilitates such functions is highly dependent on the type of monitor attached to the computer.

Conventionally, the BIOS polls the port of the computer to which a monitor should be connected to determine whether a monitor is present. If a monitor is present, the BIOS downloads a standardized file that is typically contained within a read only memory (ROM) in the monitor. This file is typically referred to as the Extended Display Identification Data (EDID) file. The EDID file contains a variety of information regarding the monitor, including information relating to the type, model, and functionality of the monitor. The BIOS contains a table which lists all of the various monitors that are supported by the computer. The BIOS reads selected information from the EDID file and compares this information to the information stored in the table.

If a match is found, the computer is configured to work with the particular type of monitor that is attached to it. For instance, if the monitor has a volume control or a sleep button, the computer is configured to support this functionality. However, if the information from the EDID file does not match the information contained within the BIOS table, the computer assumes that it is attached to a "legacy" monitor. A legacy monitor is a term that refers to a monitor having basic functionality, such as a relatively old monitor. Thus, the BIOS configures the computer into a default configuration to operate with a legacy monitor.

This conventional method of operation has its shortcomings. For instance, once the program for the BIOS is written, no monitors which were not provided for in the BIOS program may be coupled to the computer without being treated as a legacy monitor. Therefore, a new monitor having improved features or additional functionality, for instance, may operate at a reduced level of functionality, malfunction, or not function at all, if it is treated as a legacy monitor. The only way to address this problem currently is by revising the BIOS to recognize and accommodate a new monitor. However, such revisions are time consuming, expensive, and inefficient.

The present invention may address one or more of the problems discussed above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a monitor having given features. The monitor includes a housing, and a screen disposed in the housing. A memory device is disposed in the housing. The memory device stores a file identifying at least one of: (1) a compatible monitor and (2) the given features of the monitor.

In accordance with another aspect of the present invention, there is provided a device that includes a monitor and a processing unit. The monitor has given features and a file stored therein. The file contains information which identifies at least one of: (1) another monitor compatible with the monitor and (2) the given features of the monitor. The processing unit is connectable to the monitor to receive the information contained within the file. The processing unit is configurable to operate with the monitor in response to the information.

In accordance with still another aspect of the present invention, there is provided a device that includes a monitor and a processing unit. The monitor has given functions and is compatible with at least one other type of monitor. The monitor has an Extended Display Identification Data (EDID) file stored therein. The EDID file contains information which identifies one of the at least one other type of compatible monitor and which identifies the given features of the monitor. The processing unit has a list of supported monitors. The processing unit configures itself to operate with the one of the at least one other type of compatible monitor in response to the list of supported monitors containing the one of the at least one other type of compatible monitor contained in the EDID file, and the processing unit configures itself to operate with a monitor having the given functions in response to the list of supported monitors not containing the one of the at least one other type of compatible monitor contained in the EDID file.

In accordance with yet another aspect of the present invention, there is provided a computer that includes a processing unit that is connectable to read an Extended Display Identification Data (EDID) file from a monitor. The EDID file contains information which identifies an other type of compatible monitor and which identifies given features of the monitor. The processing unit stores a list of supported monitors and has a program which configures the processing unit to operate with the other type of compatible monitor in response to the list of supported monitors containing the other type of compatible monitor contained in the EDID file, and which configures the processing unit to operate with a monitor having the given functions in response to the list of supported monitors not containing the other type of compatible monitor contained in the EDID file.

In accordance with a further aspect of the present invention, there is provided a tangible computer-readable medium storing a list of supported monitors and storing a program which configures a processing unit to operate with a compatible monitor in response to the list of supported monitors containing the compatible monitor contained in an EDID file and which configures the processing unit to operate with a monitor having the given functions in response to the list of supported monitors not containing a compatible monitor contained in the EDID file.

In accordance with an even further aspect of the present invention, there is provided a method of configuring a device to operate with a monitor. The method includes the acts of: (a) storing a file in the monitor; (b) storing in the file information identifying the monitor; (c) storing in the file information relating to a type of monitor which is compatible with the identified monitor; (d) storing in the file information relating to features of the identified monitor; (e) downloading the file into the device; (f) comparing the file information identifying the monitor with a list of supported monitors; (g) configuring the device to operate with the identified monitor in response to the information identifying the monitor being contained in the list; (h) comparing the file information relating to the compatible monitor with the list of supported monitors; (i) configuring the device to operate with the compatible monitor in response to the information relating to the compatible monitor being contained in the list; and (j) configuring the device to operate with a monitor having the features of the identified monitor in response to the information relating to the compatible monitor not being contained in the list.

In accordance with a still further aspect of the present invention, there is provided a method that includes the acts of: (a) providing a monitor having a file which stores information identifying the monitor, information relating to a type of monitor which is compatible with the identified monitor, and information relating to features of the identified monitor; and (b) providing a processing unit which (1) downloads the file, (2) compares the information identifying the monitor with a list of supported monitors and configures the device to operate with the identified monitor in response to the information identifying the monitor being contained in the list, (3) compares the file information relating to the compatible monitor with the list of supported monitors and configures the device to operate with the compatible monitor in response to the information relating to the compatible monitor being contained in the list, and (4) configures the device to operate with a monitor having the features of the identified monitor in response to the information relating to the compatible monitor not being contained in the list.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
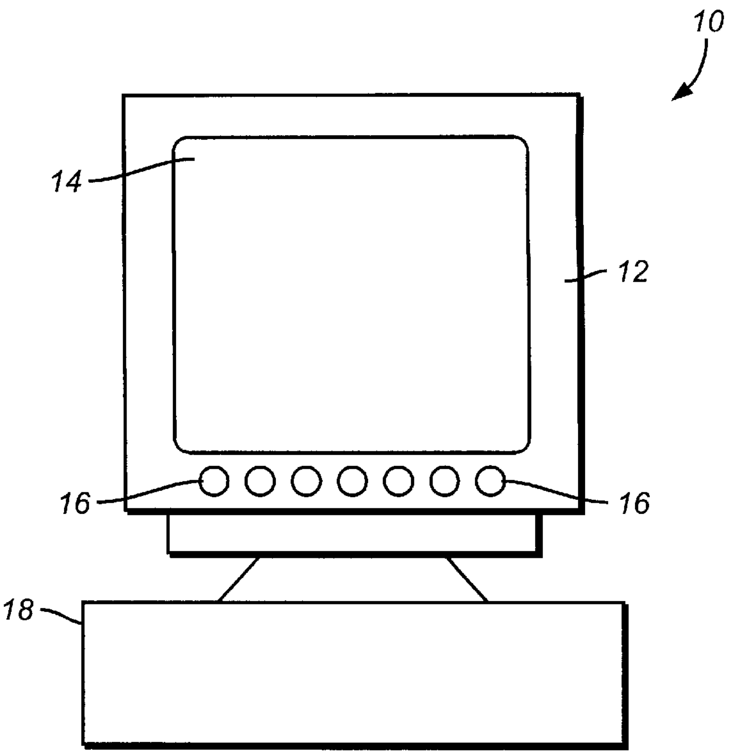
FIG. 1 illustrates a device having a monitor and a processing unit.

Turning now to the drawings, and referring initially to FIG. 1, a device, such as a television or a computer, is illustrated and generally designated by a reference numeral 10. The device 10 includes a monitor 12 that includes a video display screen 14. The video display screen 14 may be of any suitable type, such as a CRT, LCD, or flat panel display. The monitor 12 may also include one or more controls 16 which may be used to adjust the functionality of the monitor 12. For example, the controls 16 may include a volume control, a sleep button, a brightness control, a contrast control, display position control, and a display enlargement control.

The monitor 12 may be associated with a processing unit 18, such as television electronics, a computer, a video processor, or another type of compatible signal processor. The monitor 12 may or may not be integrally incorporated with the processing unit 18 of the device 10. For example, if the device 10 takes the form of a relatively conventional television or lap top computer, it is likely that the monitor 12 will be integrally incorporated in the same cabinet with the processing unit 18. In contrast, if the monitor 12 is used with a relatively conventional desk top personal computer, it is likely that the monitor 12 and the processing unit 18 will be packaged separately and coupled together by a suitable means, such as a cable.

In this embodiment, the monitor 12 includes a memory, such as a read only memory (ROM), that contains a relatively standardized file, such as an Extended Display Identification Data (EDID) file. The file stored by the monitor 12 typically includes information which identifies the monitor type, and may also include information which identifies the capabilities of the monitor, the manufacturer, and other monitor characteristics. The processing unit 18 contains a program, such as BIOS, which is capable of reading the file stored within the monitor 12 to determine whether the processing unit 18 supports the particular monitor 12 that is attached to it. As discussed previously, a conventional BIOS program contains a list of all currently supported product codes that uniquely identify each type of monitor, and each item in the list is associated with a method of BIOS interaction with that type of supported monitor. However, if the list does not include a particular type of monitor, the BIOS will interact with the monitor in a default mode that is unlikely to support the full functionality of the monitor.

As will be explained in greater detail below, the device 10 is not constrained to treat an unlisted monitor as a legacy monitor. Rather, the monitor 12 includes a file structure which not only identifies the actual type of the monitor 12, but it also identifies one or more types of monitors that are compatible with the monitor 12 and/or various features of the monitor 12. Furthermore, the program which operates on the processing unit 18 is adapted to determine whether the monitor 12 is compatible with a supported monitor and/or determine the various features of the monitor 12. Thus, even if the processing unit 18 does not recognize the monitor 12 as a specifically supported monitor, it may be configured to treat the monitor 12 as a compatible monitor and/or as a monitor having a variety of advanced features that are not supported in a default mode.

In the specific embodiment described below it should be understood that current industry standards partially dictate a particularly advantageous form of the device 10. For instance, the Video Electronic Standards Association (VESA) has promulgated the EDID standard as a compact method to specify the capabilities of a monitor. A current version of the EDID file format is illustrated in the table which is reproduced below.

As can be seen from the table reproduced above, the standard EDID file format includes a total of 128 bytes that are organized in blocks to provide information for header, vendor/product identification, EDID structure version/revision, basic display parameter/features, color characteristics, established timings, standard timing identification, detailed timing descriptions, extension flag,

EDID FILE FORMAT OVERVIEW

| No. Bytes | | Description | Format |
|---|---|---|---|
| 8 | Bytes | Header | See section 3.2.1 |
| | 1 | 00h | |
| | 1 | FFh | |
| | 1 | FFh | |
| | 1 | FFh | |
| | 1 | FFh | |
| | 1 | FFh | |
| | 1 | FFh | |
| | 1 | 00h | |
| 10 | Bytes | Vendor/Product Identification | See section 3.2.2 |
| | 2 | ID Manufacturer Name | EISA 3-character ID |
| | 2 | ID Product Code | Vendor assigned code |
| | 4 | ID Serial Number | 32-bit serial number |
| | 1 | Week of Manufacture | Week number |
| | 1 | Year of Manufacture | Year |
| 2 | Bytes | EDID Structure Version/Revision | See sections 2.2, 2.3 & 3.3 |
| | 1 | Version # | Binary |
| | 1 | Revision # | Binary |
| 5 | Bytes | Basic Display Parameters/Features | See section 3.4 |
| | 1 | Video Input Definition | |
| | 1 | Max. Hz. Image Size | cm. |
| | 1 | Max. Vt. Image Size | cm. |
| | 1 | Display Transfer Characteristic (Gamma) | Binary |
| | 1 | Feature Support (DPMS) | |
| 10 | Bytes | Color Characteristcs | Based on 1931 CIE Chart, see 3.5 |
| | 1 | Red/Green Low Bits | Rx1 Rx0 Ry1 Ry0 Gx1 Gx0 Gy1 Gy0 |
| | 1 | Blue/White Low Bits | Bx1 Bx0 By1 By0 Wx1 Wy1 Wy1 Wy0 |
| | 1 | Red-x | Red-x Bits 9-2 |
| | 1 | Red-y | Red-y Bits 9-2 |
| | 1 | Green-x | Green-x Bits 9-2 |
| | 1 | Green-y | Green-y Bits 9-2 |
| | 1 | Blue-x | Blue-x Bits 9-2 |
| | 1 | Blue-y | Blue-y Bits 9-2 |
| | 1 | White-x | White-x Bits 9-2 |
| | 1 | White-y | White-y Bits 9-2 |
| 3 | Bytes | Established Timings | See section 3.6 |
| | 1 | Established Timings 1 | |
| | 1 | Established Timings 2 | |
| | 1 | Manufacturers Reserved Timings | |
| 16 | Bytes | Standard Timing Identification | See section 3.7 |
| | 2 | Standard Timing Identification #1 | |
| | 2 | Standard Timing Identification #2 | |
| | 2 | Standard Timing Identification #3 | |
| | 2 | Standard Timing Identification #4 | |
| | 2 | Standard Timing Identification #5 | |
| | 2 | Standard Timing Identification #6 | |
| | 2 | Standard Timing Identification #7 | |
| | 2 | Standard Timing Identification #8 | |
| 72 | Bytes | Detailed Timing Descriptions | See section 3.8 |
| | 18 | Detailed Timing Description #1 or Monitor Descriptor | Use is dependent on EDID structure version and revision numbers |
| | 18 | Detailed Timing Description #2 or Monitor Descriptor | Use is dependent on EDID structure version and revision numbers |
| | 18 | Detailed Timing Description #3 or Monitor Descriptor | Use is dependent on EDID structure version and revision numbers |
| | 18 | Detailed Timing Description #4 or Monitor Descriptor | Use is dependent on EDID structure version and revision numbers |
| 1 | Byte | Extension Flag | Number of (optional) 128 byte EDID extension blocks to follow |
| 1 | Byte | Checksum | The 1 byte sum of all 128 bytes in this EDID block shall equal zero |

and checksum. Although many of these blocks are presently defined and currently used, certain blocks are reserved.

Figure 2:
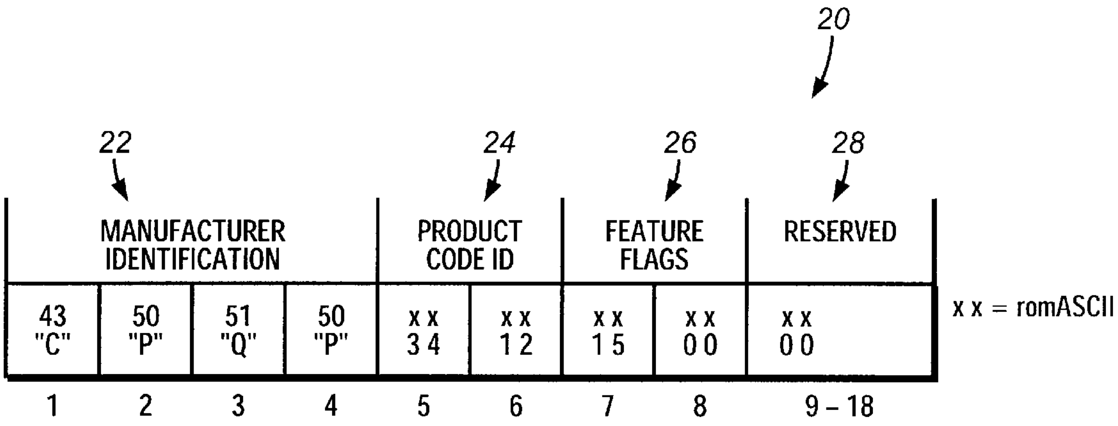
FIG. 2 illustrates the contents of a portion of a file in accordance with an aspect of the present invention.

To incorporate information related to monitor compatibility and/or functionality, a portion of the EDID file may be redefined. For example, the 18-byte block labeled "Detailed Timing Description # 3" may be redefined to contain compatibility and feature information for the monitor 12. One example of such a redefinition is illustrated in FIG. 2. In this example, the block 20 has been redefined into four separate fields 22, 24, 26, and 28. The first field is defined as a "Manufacturer Identification" field. The manufacturer ID field 22 contains four bytes. In this example, the first three bytes contain hexadecimal numerals that correspond to the ASCII letters CPQ, which stand for "Compaq." The last byte of the manufacturer ID field 22 contains a hexadecimal numeral which corresponds to the ASCII letter P, which stands for "Presario®." Carrying this particular example further, the fourth byte of the manufacturer ID field 22, which acts as a model designator, may contain the hexadecimal numeral that corresponds to the ASCII letter D for "Deskpro®" or the hexadecimal numeral that corresponds to the ASCII letter M for "Mobile," for example.

The second field is designated as the ID product code field 24. The ID product code field 24, in this illustration, includes two bytes. The first byte, byte 5, contains the least significant byte of the field 24, and the second byte, byte 6, contains the most significant byte of the field 24. The 16 bit value contained within the ID product code field 24 corresponds to a compatible monitor that supports the same or similar features as the monitor 12. It should be noted that the standard EDID file contains a similar ID product code field in the block labeled "vendor/product identification." Like the ID product code field in the standard EDID format, the ID product code field 24 contains a vendor-assigned code that identifies the particular type of monitor. Ideally, the EDID file for the monitor 12 will include an ID product code identifying the particular type of the monitor 12 in the "vendor/product identification" block, and the EDID file for the monitor 12 will further include an ID product code of a compatible monitor having similar features in the ID product code field 24 contained in the redefined "detailed timing description # 3" block. Additionally, although its function may not be fully appreciated until the subsequent discussion is reviewed, it should be mentioned now that the block 20 may contain more than one ID product code field 24 so that more than one monitor compatible with the monitor 12 may be listed.

The next field in the block 20 is the feature flag field 26. In this embodiment, the feature flag field 26 contains two bytes, bytes 7 and 8, which may contain up to 16 feature support flags. A binary value of "0" may indicate that the feature is not supported, while a binary value of "1" may indicate that the feature is supported. It should be readily appreciated that the size of the feature flag field 26 may be adjusted based upon the number of features that the monitor 12 may include.

Finally, it should be noted that the last ten bytes, bytes 9–18, of the block 20 form a reserved field 28. Although the bytes in the reserved field 28 are not utilized in this particular embodiment, these bytes could be used to contain additional ID product codes and/or feature flags as mentioned above.

Figure 3:
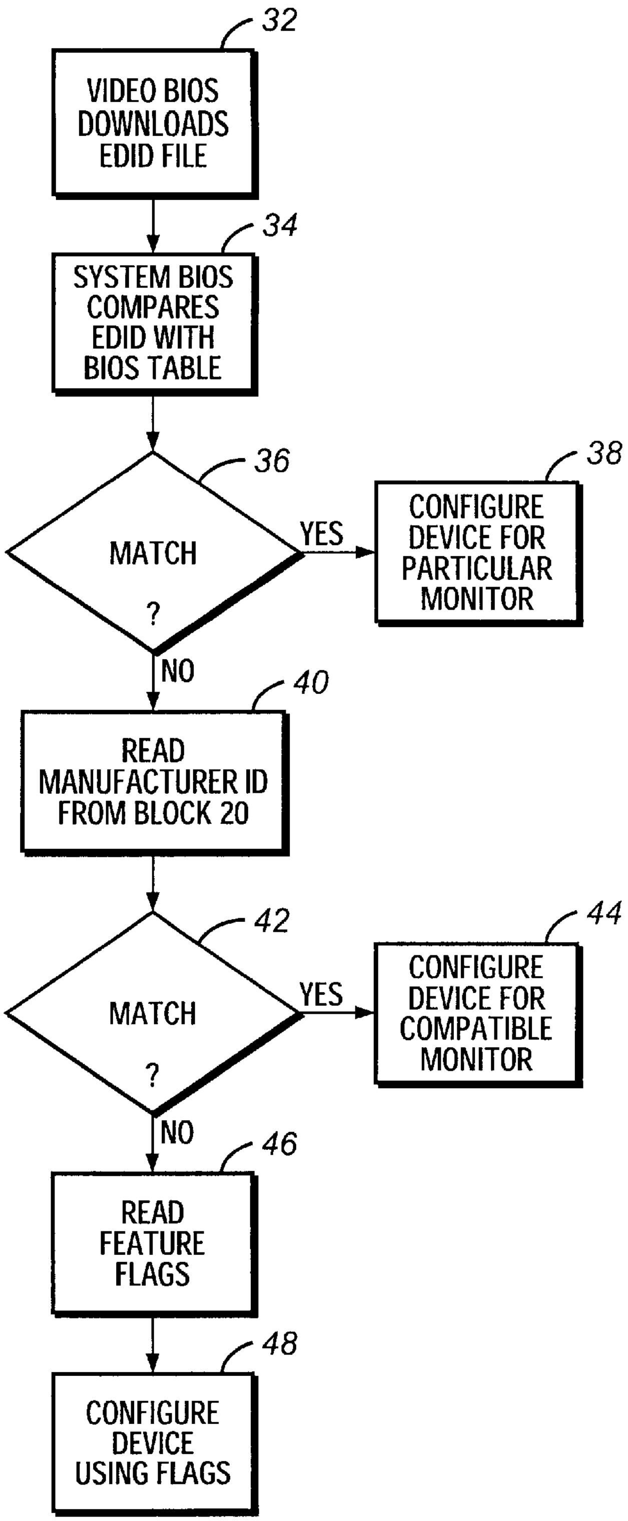
FIG. 3 illustrates a flow chart depicting the operation of the device illustrated in FIG. 1 for determining the compatibility and functionality of an unsupported monitor.

Turning now to FIG. 3, a flowchart 30 describes the manner in which the processing unit 18 utilizes the files stored in the monitor 12 to configure itself to operate effectively with the monitor 12. In this embodiment, a program, such as a video BIOS and a system BIOS, stored within the device 18 carries out the functions set forth in the flowchart 30. However, it should be recognized that identical or similar functionality may be carried out by a variety of combinations of software, firmware, and hardware.

As illustrated in the block 32, the video BIOS of the device 18 downloads the EDID file from the monitor 12. The system BIOS then compares information within the EDID file with information listed in a table of the system BIOS, as set forth in the block 34. Specifically, the system BIOS looks to the ID manufacturer name and the ID produce code stored in the "vendor/product identification" block of the EDID file. If this information matches information stored within the table of the system BIOS, as set forth in the decision block 36, then the monitor 12 is of a type that is specifically supported by the processing unit 18. Accordingly, the BIOS configures the processing unit 18 to operate with the particular monitor 12, as set forth in the block 38.

The manner of operation described thus far is essentially the manner is which a conventional device operates. However, as explained above, if a match is not found in a conventional system, the system is configured to operate in default mode. In this system, however, if a match is not found, the system BIOS reads the manufacturer ID and ID product code from the block 20 of the EDID file, as set forth in the block 40. As mentioned previously, the ID product code stored in the block 20 corresponds to a monitor that is compatible with the monitor 12. Thus, if this information matches information stored within the table of the system BIOS, as set forth in the decision block 42, then the monitor 12 is compatible with a type of monitor specifically supported by the processing unit 18. Accordingly, the processing unit 18 may use the parameters of the compatible monitor to configure itself for operation with the previously unsupported monitor 12, as set forth in the block 44.

Of course, it is possible that a situation may exist where the operating program stored within the processing unit 18 does not include information related to the new monitor 12 or to any compatible monitor. In such a situation, it would be advantageous to be able to configure the processing unit 18 to support a monitor having a higher level of functionality than a legacy monitor. Therefore, is no match is found in the decision block 42, the BIOS of the processing unit 18 reads the feature flags stored in the field 26 of the block 20, as set forth in the block 46. As mentioned above, these feature flags may be set to indicate features or functionality provided by the monitor 12. Using these feature flags, the device 18 may configure itself to support the one or more features of the monitor 12, as set forth in the block 48.

Although the embodiment described above offers the advantages of having information related to both a compatible monitor or monitors, as well as backup information related to the features supported by the monitor 12, other embodiments are envisioned which use variations of this information. For instance, in one alternative embodiment, the feature flag information stored in the field 26 of the block 20 may be absent from the file stored in the monitor 12. In this instance, the modes of operation described in blocks 46 and 48 of the flowchart 30 would not be used. Rather, the device 18 merely looks to the information stored in the field 24 of the block 20 to determine whether the listed information contains one or more ID product codes of compatible monitors that are supported by the processing unit 18. Also, although the field 24 may include a single ID product code as described above, it may be advantageous in this embodiment or the earlier embodiment to include more than one ID product codes in the field 24 of the block 20. For example, the ID product code listed first may be compared with the table stored in the BIOS of the processing unit 18 to determine whether the compatible monitor was supported by the processing unit 18. If not, each successive ID product code may be read and compared until a match is found.

In yet another alternative embodiment, the block 20 may be configured so that it does not contain ID product code information such as that listed in the field 24. Rather, the block 20 may be configured to contain only information related to the functionality of the monitor 12, such as the information set forth in the feature flag field 26 of the block 20. In this instance, the functionality described in blocks 40, 42, and 44 of the flowchart 30 would not be used during the operation of the processing unit 18. Instead, if the actual type of the monitor 12 is not supported specifically by the processing unit 18, the processing unit 18 would read the feature flag information stored in the field 26 so that it may configure itself to support the functionality of the monitor 12.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A display monitor having given features comprising:

a housing;

a screen disposed in the housing; and a memory device disposed in the housing, the memory device storing a file identifying (1) a compatible monitor and (2) the given features of the display monitor.

2. The display monitor, as set forth in claim 1, wherein the file comprises an Extended Display Identification Data (EDID) file.

3. The display monitor, as set forth in claim 1, wherein the file identifies a plurality of compatible monitors.

4. The display monitor, as set forth in claim 1, wherein the file identifies the given features using feature flags.

5. A device comprising:

a display monitor having given features and having a file stored therein, the file containing information which identifies (1) another monitor compatible with the display monitor and (2) the given features of the display monitor; and a processing unit being connectable to the display monitor to receive the information contained within the file, the processing unit being configurable to operate with the display monitor in response to the information.

6. The device, as set forth in claim 5, wherein the file comprises an Extended Display Identification Data (EDID) file.

7. The device, as set forth in claim 5, wherein the file identifies a plurality of compatible monitors.

8. The device, as set forth in claim 5, wherein the file identifies the given features using feature flags.

9. The device, as set forth in claim 5, wherein the display monitor and the processing unit are disposed in an integral housing.

10. The device, as set forth in claim 5, wherein the display monitor and the processing unit are disposed in separate housings.

11. The device, as set forth in claim 5, wherein the processing unit comprises an operating system having a list of supported monitors, the operating system configuring the processing unit to operate with the compatible monitor identified in the file in response to the list of supported monitors containing the compatible monitor identified in the file, and the operating system configuring the processing unit to operate with a monitor having the given features in response to the list of supported monitors not containing the compatible monitor identified in the file.

12. A display monitor having given features and being functionally compatible with at least one other type of monitor comprising:

a housing;

a screen disposed in the housing; and a memory device disposed in the housing, the memory device storing an Extended Display Identification Data (EDID) file identifying one of the at least one other type of compatible monitor and identifying the given features of the display monitor.

13. The display monitor, as set forth in claim 12, wherein the EDID file identifies a plurality of compatible monitors.

14. The display monitor, as set forth in claim 12, wherein the EDID file identifies the given features using feature flags.

15. A device comprising:

a display monitor having given features and being compatible with at least one other type of monitor, the display monitor having an Extended Display Identification Data (EDID) file stored therein, the EDID file containing information which identifies one of the at least one other type of compatible monitor and which identifies the given features of the display monitor; and a processing unit having a list of supported monitors, the processing unit configuring itself to operate with the one of the at least one other type of compatible monitor in response to the list of supported monitors containing the one of the at least one other type of compatible monitor contained in the EDID file, and the processing unit configuring itself to operate with a monitor having the given features in response to the list of supported monitors not containing the one of the at least one other type of compatible monitor contained in the EDID file.

16. The device, as set forth in claim 15, wherein the EDID file identifies a plurality of compatible monitors.

17. A device comprising:

a monitor having given features and being compatible with at least one other type of monitor, the monitor having an Extended Display Identification Data (EDID) file stored the rein, the EDID file containing information which identifies one of the at least one other type of compatible monitor and which identifies the given features of the monitor; and a processing unit having a list of supported monitors, the processing unit configuring itself to operate with the one of the at least one other type of compatible monitor in response to the list of supported monitors containing the one of the at least one other type of compatible monitor contained in the EDID file, and the processing unit configuring itself to operate with a monitor having the given features in response to the list of supported monitors not containing the one of the at least one other type of compatible monitor contained in the EDID file.

18. The device, as set forth in claim 15, wherein the display monitor and the processing unit are disposed in an integral housing.

19. The device, as set forth in claim 15, wherein the display monitor and the processing unit are disposed in separate housings.

20. The device, as set forth in claim 15, wherein the processing unit comprises an operating system having the list of supported monitors, the operating system configuring the processing unit to operate with the compatible monitor identified in the EDID file in response to the list of supported monitors containing the compatible monitor identified in the EDID file, and the operating system configuring the processing unit to operate with a monitor having the given features in response to the list of supported monitors not containing the compatible monitor identified in the EDID file.

21. A computer comprising:

a processing unit being connectable to read an Extended Display Identification Data (EDID) file from a display monitor, the EDID file containing information which identifies an other type of compatible monitor and which identifies given features of the display monitor, the processing unit storing a list of supported monitors and having a program which configures the processing unit to operate with the other type of compatible monitor in response to the list of supported monitors containing the other type of compatible monitor contained in the EDID file, and which configures the processing unit to operate with a monitor having the given features in response to the list of supported monitors not containing the other type of compatible monitor contained in the EDID file.

22. The computer, as set forth in claim 21, further comprising:

a display monitor having given features and being compatible with at least one other type of monitor, the display monitor having an Extended Display Identification Data (EDID) file stored therein, the EDID file containing information which identifies one of the at least one other type of compatible monitor and which identifies the given features of the display monitor.

23. The computer, as set forth in claim 21, wherein the EDID file identifies a plurality of compatible monitors.

24. The computer, as set forth in claim 21, wherein the EDID file identifies the given features using feature flags.

25. The computer, as set forth in claim 22, wherein the display monitor and the processing unit are disposed in an integral housing.

26. The computer, as set forth in claim 22, wherein the display monitor and the processing unit are disposed in separate housings.

27. An apparatus comprising:

a tangible computer-readable medium storing a list of supported monitors and storing a program which configures a processing unit to operate with a compatible monitor in response to the list of supported monitors containing the compatible monitor contained in an Extended Display Identification Data (EDID) file and which configures the processing unit to operate with a monitor having the given features in response to the list of supported monitors not containing a compatible monitor contained in the EDID file.

28. A method of configuring a device to operate with a monitor, the method comprising the acts of:

(a) storing a file in the monitor;
(b) storing in the file information identifying the monitor;
(c) storing in the file information relating to a type of monitor which is compatible with the identified monitor;
(d) storing in the file information relating to features of the identified monitor;
(e) downloading the file into the device;
(f) comparing the file information identifying the monitor with a list of supported monitors;
(g) configuring the device to operate with the identified monitor in response to the information identifying the monitor being contained in the list;
(h) comparing the file information relating to the compatible monitor with the list of supported monitors;
(i) configuring the device to operate with the compatible monitor in response to the information relating to the compatible monitor being contained in the list; and
(j) configuring the device to operate with a monitor having the features of the identified monitor in response to the information relating to the compatible monitor not being contained in the list.

29. The method, as set forth in claim 28, wherein act (a) comprises the act of storing an Extended Display Identification Data file in the monitor.

30. The method, as set forth in claim 28, wherein act (c) comprises the act of storing in the file information relating to a plurality of types of monitors which are compatible with the identified monitor.

31. The method, as set forth in claim 28, wherein act (d) comprises the act of storing the file information relating to the features of the identified monitor in the form of flags.

32. The method, as set forth in claim 28, wherein the acts are performed in the recited order.

33. A method of improving compatibility of a monitor, the method comprising the acts of:

(a) storing a file in the monitor;
(b) storing in the file information identifying the monitor;
(c) storing in the file information relating to a type of monitor which is compatible with the identified monitor; and
(d) storing in the file information relating to features of the identified monitor.

34. The method, as set forth in claim 33, wherein act (a) comprises the act of storing an Extended Display Identification Data file in the monitor.

35. The method, as set forth in claim 33, wherein act (c) comprises the act of storing in the file information relating to a plurality of types of monitors which are compatible with the identified monitor.

36. The method, as set forth in claim 33, wherein act (d) comprises the act of storing the file information relating to the features of the identified monitor in the form of flags.

37. The method, as set forth in claim 33, wherein the acts are performed in the recited order.

38. A method of configuring a device to operate with a monitor, the method comprising the acts of:

(a) downloading a file from the monitor into the device, the file containing information identifying the monitor, identifying a compatible monitor, and identifying features of the monitor;
(b) comparing the information identifying the monitor with a list of supported monitors;
(c) configuring the device to operate with the identified monitor in response to the information identifying the monitor being contained in the list;
(d) comparing the information identifying the compatible monitor with the list of supported monitors;
(e) configuring the device to operate with the compatible monitor in response to the information identifying the compatible monitor being contained in the list; and
(f) configuring the device to operate with a monitor having the identified features in response to the information identifying the compatible monitor not being contained in the list.

39. A method of manufacturing a device, the method comprising the acts of:

(a) providing a monitor having a file which stores information identifying the monitor, information relating to a type of monitor which is compatible with the identified monitor, and information relating to features of the identified monitor; and (b) providing a processing unit which (1) downloads the file, (2) compares the information identifying the monitor with a list of supported monitors and configures the device to operate with the identified monitor in response to the information identifying the monitor being contained in the list, (3) compares the file information relating to the compatible monitor with the list of supported monitors and configures the device to operate with the compatible monitor in response to the information relating to the compatible monitor being contained in the list, and (4) configures the device to operate with a monitor having the features of the identified monitor in response to the information relating to the compatible monitor not being contained in the list.

* * * * *